UNITED STATES PATENT OFFICE.

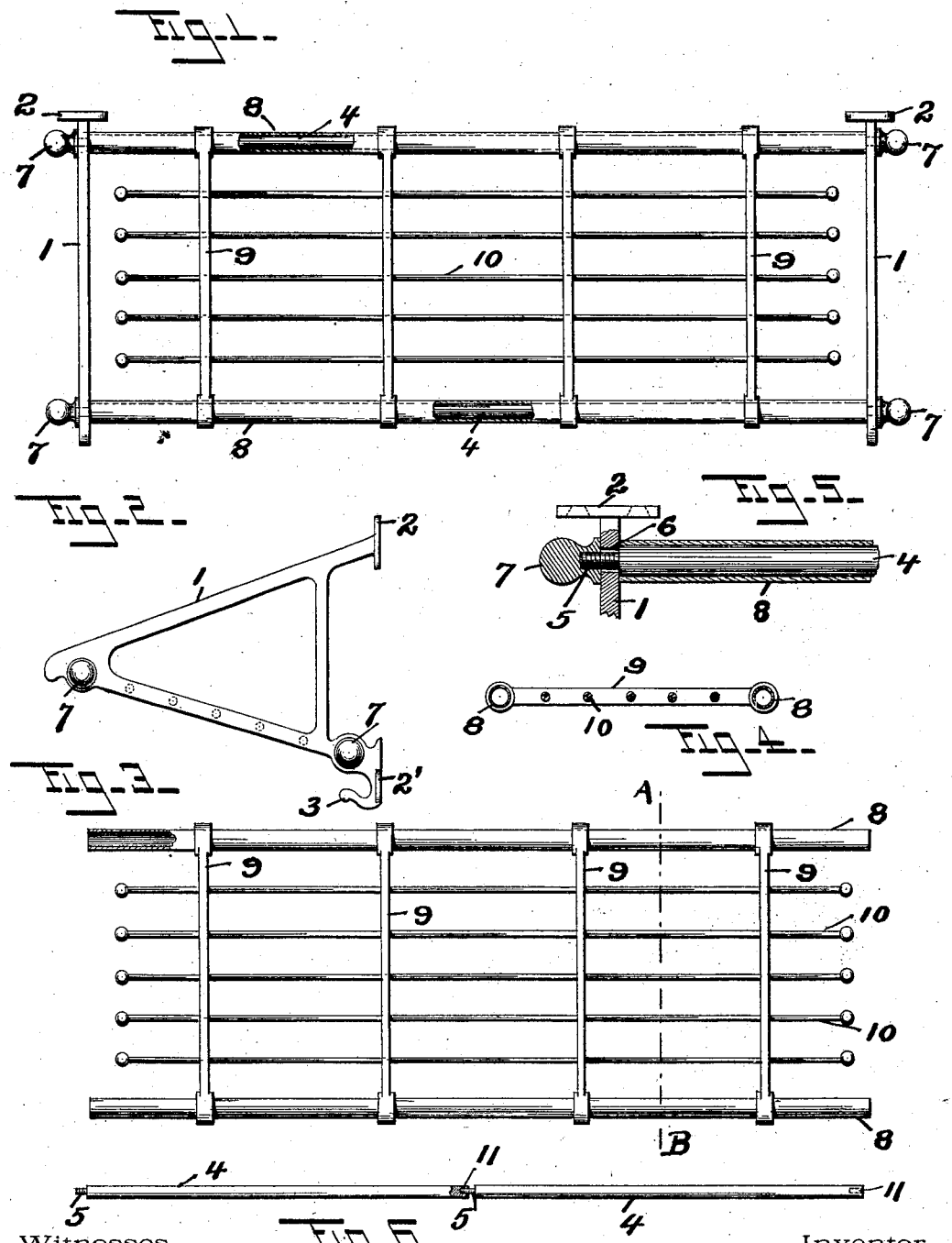

WILLIAM B. McCARTHY, OF NEW HAVEN, CONNECTICUT.

CAR-RACK.

SPECIFICATION forming part of Letters Patent No. 711,642, dated October 21, 1902.

Application filed May 6, 1902. Serial No. 106,210. (No model.)

*To all whom it may concern:*

Be it known that I, WILLIAM B. MCCARTHY, a citizen of the United States, residing in New Haven, in the county of New Haven and State of Connecticut, have invented certain new and useful Improvements in Car-Racks, of which the following is a specification, reference being had therein to the accompanying drawings.

My invention relates to improvements in car-racks, and has for its object, among other things, the construction of a rack which can be conveniently attached to the wall and having a body member that can be removed from the wall-brackets as a unit, and, further, to so arrange the parts that the rack can be extended or lengthened, if desired.

To these and other ends my invention consists in the car-rack having certain details of construction and combination of parts, as will be hereinafter described, and more particularly pointed out in the claims.

Referring to the drawings, in which like numerals designate like parts in the several figures, Figure 1 is a plan view of my invention complete. Fig. 2 is an end view thereof. Fig. 3 is plan view of the body member. Fig. 4 is a section thereof upon line A B of Fig. 3. Fig. 5 is a fragmentary plan view of one of the brackets, tie-rods, and a portion of the body member; and Fig. 6 is an elevation of two of the tie-rods, illustrating the manner of connecting the same when used with an extension-rack.

Heretofore the racks or baskets used in passenger-coaches have either been made of parts immovably secured to the wall or of wire or other netting which cannot be readily removed while renovating the car. In my invention the car-rack is so designed that it can be readily attached to and removed from the wall, and consists, essentially, of a bracket at either end which is secured to the wall and supports connecting-rods therebetween, upon which is slidably mounted a body member which is composed of several parts rigidly secured together, making the body member a unitary structure.

In the drawings the numerals 1 1 designate the brackets, which are provided with feet 2 2', through which screws are passed to fasten the brackets to the wall of the car and upon the lower end of the foot 2' is the coat and hat hook 3, as is common in brackets of this character. Connecting the two brackets are the tie-rods 4 4, which, as shown in Figs. 1 and 5, are reduced at either end, forming a threaded shank 5, which projects through the hole 6 in the brackets and has a tip or acorn 7 on the end thereof.

The body comprises two tubular members 8 8, a plurality of cross-arms 9, connecting said tubular members, and extending through said arms parallel to said tubular members 8 are the rods 10. The rods 9 are secured to the tubular members 8 and the rods 10 to the arms 9 in any preferred manner, either by sweating, soldering, or riveting, it only being essential that they should be rigidly secured together, so that the body member can be moved as a unit. Any other design or style of bracket or body member can be used equally as well within my invention as the one shown, and I do not, therefore, limit myself to the exact designs illustrated.

To secure the rack to the wall, one of the brackets 1 is first fastened thereto and then the rods 4 fastened to said bracket by passing the threaded shanks 5 thereon through the hole 6 and threading the tip or acorn 7 thereon, after which the body member is placed in position by sliding the rods 4 through the tubes 8. The other bracket 1 is now fastened in position with the threaded shanks 5 upon the opposite end of the rods 4, projecting through the holes 6 in the bracket, after which the tips or acorns 7 are secured thereon, thereby completing the rack, as shown in Fig. 1.

For extension-racks the tie-rods 4 are provided at one end with a shank 5, Fig. 6, and the other end with a threaded hole 11. In constructing an extension-rack the first bracket, the tie-rods 4, and the body member are secured in the manner above described, then the second bracket is fastened in place and the rods 4, forming part of the next section of the rack, are secured into the rods 4 of the first section, Fig. 6, by passing the threaded shank 5 through the hole 6 in the second bracket and screwing it into the threaded hole 11 in the end of the rods 4 of the first section. The body member is now placed upon the rods 4 of the second section, which is completed by fastening a new bracket to the wall. These operations can be repeated indefinitely and as many sections added as necessary, thus making a rack of any desired length.

There are minor changes and alterations that can be made within my invention aside from those herein shown and suggested, and I would therefore have it understood that I do not limit myself to the exact construction herein shown and described, but claim all that falls fairly within the spirit and scope of my invention.

I am aware that car-racks have been heretofore made with a body member composed of wire-netting; but I disclaim such construction.

Having described my invention, what I claim, and desire to secure by Letters Patent, is—

1. In a car-rack, the combination with supporting-brackets; of tie-rods connected therewith; and a body member composed of parallel tube members joined together by nonflexible members, the said tube members being slidably mounted upon said tie-rods, substantially as shown and described.

2. In a car-rack, the combination with the supporting-brackets 1; of the tie-rods 4 secured therein; and the body member composed of the tubular members 8, cross-arms 9 and rods 10, mounted on said tie-rods 4, substantially as shown and described.

In testimony whereof I affix my signature in presence of two witnesses.

WILLIAM B. McCARTHY.

Witnesses:
GEORGE E. HALL,
J. PETER DEJON.